United States Patent
Stiesdal

(10) Patent No.: US 9,431,857 B2
(45) Date of Patent: Aug. 30, 2016

(54) PERMANENT MAGNET ROTOR ARRANGEMENT INCORPORATING PROFILED TUBES FOR PERMANENT MAGNETS

(71) Applicant: Henrik Stiesdal, Odense C (DK)

(72) Inventor: Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/083,963

(22) Filed: Nov. 19, 2013

(65) Prior Publication Data

US 2014/0077651 A1    Mar. 20, 2014

Related U.S. Application Data

(63) Continuation of application No. 13/180,575, filed on Jul. 12, 2011, now Pat. No. 8,629,595.

(30) Foreign Application Priority Data

Jul. 20, 2010  (EP) .................... 10007522

(51) Int. Cl.
  *H02K 21/12*  (2006.01)
  *H02K 1/27*   (2006.01)
  *H02K 1/28*   (2006.01)

(52) U.S. Cl.
  CPC ........ *H02K 1/27* (2013.01); *H02K 1/28* (2013.01); *H02K 1/278* (2013.01); *Y02E 10/725* (2013.01); *Y10T 29/49009* (2015.01)

(58) Field of Classification Search
  CPC .................................................... H02K 1/17
  USPC ............ 310/156.01, 156.19, 156.21, 156.23, 310/156.28, 156.22
  See application file for complete search history.

(56) References Cited

U.S. PATENT DOCUMENTS

| 4,724,348 A * | 2/1988 | Stokes .................... 310/152 |
| 5,650,680 A * | 7/1997 | Chula .................... 310/156.53 |
| 2009/0021088 A1* | 1/2009 | Groendahl .................... 310/44 |
| 2009/0079285 A1* | 3/2009 | Koumura .................... 310/156.16 |
| 2011/0169595 A1* | 7/2011 | Clark .................... 335/219 |

FOREIGN PATENT DOCUMENTS

| CN | 1956293 A | 5/2007 |
| CN | 101090213 A | 12/2007 |
| JP | 2003324916 A | 11/2003 |
| JP | 2004023864 A * | 1/2004 |
| JP | 2007236160 A * | 9/2007 |
| JP | 2008236895 A * | 10/2008 |

OTHER PUBLICATIONS

Machine Translation JP2004023864 (2004).*

* cited by examiner

*Primary Examiner* — Joshua Benitez-Rosario
*Assistant Examiner* — Jose Gonzalez Quinone

(57) ABSTRACT

A permanent magnet rotor arrangement includes a rotor and a plurality of nonmagnetic, axially extending profiled tubes defining a closed channel and affixed circumferentially along the outer rim of the rotor. A plurality of permanent magnet pole pieces are arranged in the channels. A single pole piece is arranged in each channel. The cross-sectional profile of the pole piece does not correspond to the cross-sectional profile of the channel.

10 Claims, 3 Drawing Sheets

PERMANENT MAGNET ROTOR ARRANGEMENT INCORPORATING PROFILED TUBES FOR PERMANENT MAGNETS

CROSS REFERENCE TO RELATED APPLICATIONS

This application is a continuation of U.S. patent application Ser. No. 13/180,575, filed Jul. 12, 2011, which in turn claims priority of European Patent Office application No. 10007522.5 EP filed Jul. 20, 2010. All of the applications are incorporated by reference herein in their entirety.

FIELD OF INVENTION

The invention concerns a permanent magnet rotor arrangement comprising a rotor and a plurality of permanent magnet pole pieces.

BACKGROUND OF INVENTION

Permanent magnet rotor arrangements are often used in applications, wherein low-speed large-diameter electrical generators are employed, like, for example, wind turbine generators.

Such a permanent magnet rotor arrangement is known from EP 1 860 755 A2. The rotor arrangement described therein includes a rotor having a radially outer rim. A circumferential array of magnet carriers is affixed to the outer rim, wherein the magnet carriers have a radially outer surface. An inverted U-shaped pole piece retainer made of nonmagnetic material is affixed to each magnet carrier forming an axially extending channel, wherein pole pieces of a permanent magnetic material are located adjacent to the magnetic carriers in the channels.

SUMMARY OF INVENTION

It is an object of the current invention to provide an alternative construction of a permanent magnet rotor arrangement while protecting the permanent magnets from environmental influences.

To solve this problem, a permanent magnet rotor arrangement according to the invention comprises a rotor, a plurality of nonmagnetic profiled tubes defining a closed channel and affixed circumferentially along the outer rim of the rotor and a plurality of permanent magnet pole pieces arranged in the channels.

Thus, the pole pieces made from the permanent magnetic material are fully encapsulated by the tubes axially extending along the in particular cylindrical surface of the rotor and consequently better protected with respect to environmental influences. As the tubes are made from a non-magnetic material, like for example PVC or stainless steel, the non-magnetic tubes to not influence the magnetic properties of the permanent magnet rotor arrangement.

The tubes are preferably monolithic, i.e. manufactured as one piece to provide still better protection for the pole pieces housed within the channels defined by the tubes.

While it is in principle possible to locate more than one pole piece in a tube, preferably one pole piece is arranged in each channel. In such an embodiment, the cross-sectional profile of the pole piece can correspond to the cross-sectional profile of the channel, which means that their profiles are substantially equal. In this manner, the pole pieces can not or only slightly move, so that the rotor is mechanically stable. However, in an alternative embodiment, the cross-sectional profile of the pole piece does not correspond to the cross-sectional profile of the channel. If the dimensions of the pole piece are smaller than the dimensions of the channel, the pole piece can be easily inserted into the tube. Preferably, a filler substance, in particular a resin, is arranged in spaces between the pole piece and the inner surface of the tube. Thus, mechanical stability when the rotor is rotating can be secured or at least improved and the pole pieces are kept in their predetermined positions.

In a preferred embodiment, the tubes may be affixed to the rotor by a dovetail joint. For example, at least one protrusion of the tubes may engage at least one corresponding groove of the rotor. The grooves may be formed by a T-shaped protrusion of the rotor, such that adjacent tubes may be affixed on either side of the rotor protrusion in the respectively formed grooves. Of course, other embodiments, in particular embodiments also using such a "key and slot" configuration, are conceivable. In this manner, a robust attachment of the tubes to the rotor can be realised.

However, the manner of affixing the tubes to the rotor is not limited to this type of joint. Alternatively, for example, the tubes may be affixed to the rotor by welding or spot welding or bolting or adhering. For example, radial protrusions of the tubes may be bolted to the rotor yoke.

Often, it is desired to mount the pole pieces to a magnet carrier, for example for connecting them to the rotor. To facilitate the usage of these magnet carriers, two alternative embodiments of the current invention can be used.

First, it is possible to affix the tubes onto at least one magnet carrier being affixed to the rotor. In this embodiment, the pole piece/tube-unit is affixed to the magnet carrier, which is in turn affixed to the rotor.

In the alternative, the pole pieces are affixed on and/or supported by a magnet carrier, wherein the magnet carrier and the pole piece are enclosed in the channel. In this embodiment, the permanent magnet (the pole piece) as well as the magnet carrier are positioned in the profiled tube, so that also the magnet carrier may be protected from environmental influences.

Further, the current invention also concerns a method of producing a permanent magnet rotor arrangement according to the current invention, wherein the pole pieces are inserted into the channels in a magnetized or a demagnetized state.

It is preferred to insert the pole pieces in a demagnetized state to facilitate the insertion which, in this case, is not hampered by magnetic forces arising between different components, in particular different magnets. However, since the remagnetizing may be a complicated process, also the other alternative is contemplated.

A case in which the profiles of the channel and the magnets do not match has already been discussed. In addition to filling the spaces between the inner wall of the tubes and the outer surface of the pole piece with a filler, preferably a resin, the inventive method proposes advantageous alternative solutions which aim at matching the profiles after insertion of the pole pieces into the channels.

Thus it can be provided that a pole piece having a first cross-sectional shape is inserted into a channel having a second cross sectional shape, the cross section of the pole piece being smaller than the cross section of the channel, wherein the tube is compressed by an external compressing means or a vacuum is applied to the tube to match the second cross section to the first cross section. In the first proposed embodiment, external pressing means are used to deform the tube such that their cross-sectional profiles are finally substantially equal with a final cross-sectional profile of the pole piece and a final cross-sectional profile of the channel. Alternatively, the profile tube can be evacuated such that the tube material deforms as a result of the pressure difference and the tube shrinks to take the shape of the permanent magnet.

BRIEF DESCRIPTION OF THE DRAWINGS

Further advantages and details of the current invention can be taken from the following detailed description of preferred embodiments of the invention as well as the drawings, in which.

DETAILED DESCRIPTION OF INVENTION

Figure 1:
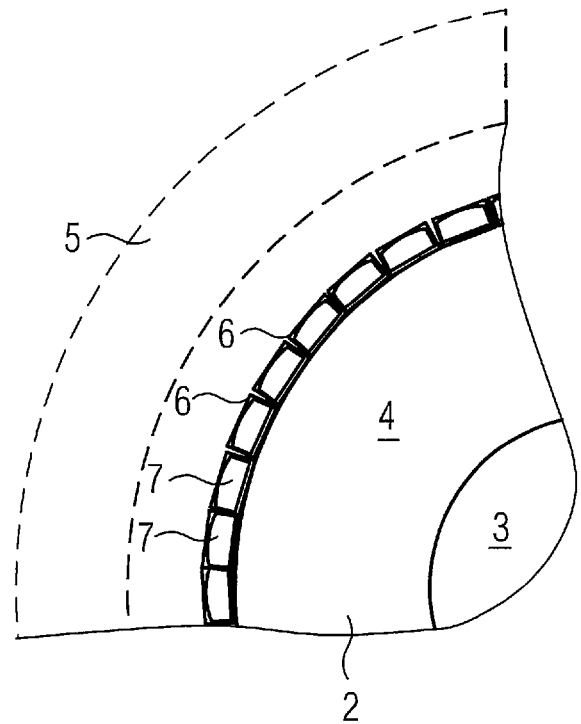
FIG. 1 is a view of a permanent magnet rotor arrangement according to the invention.

FIG. 1 shows a first embodiment of a permanent magnet rotor arrangement 1 which can, for example, be used in a wind turbine generator. For simplicity, only a part of the substantially circular cross section is shown.

The permanent magnet rotor arrangement 1 comprises a massive rotor 2 having a central bore 3, in particular for mounting the rotor on a shaft. The rotor has an outer rim 4. The rotor is mounted to rotate within a fixed stator 5 which is only indicated.

On the outer surface of the rim 4, a circumferential array of axially extending tubes 6 made of a non-magnetic material are affixed. In each tube, a permanent magnet pole piece 7 is located. The tubes 6 may be affixed to the rotor 2 using an adhesive. However, other methods for affixing the tubes are conceivable and will be shown in some of the following embodiments.

Figure 2:
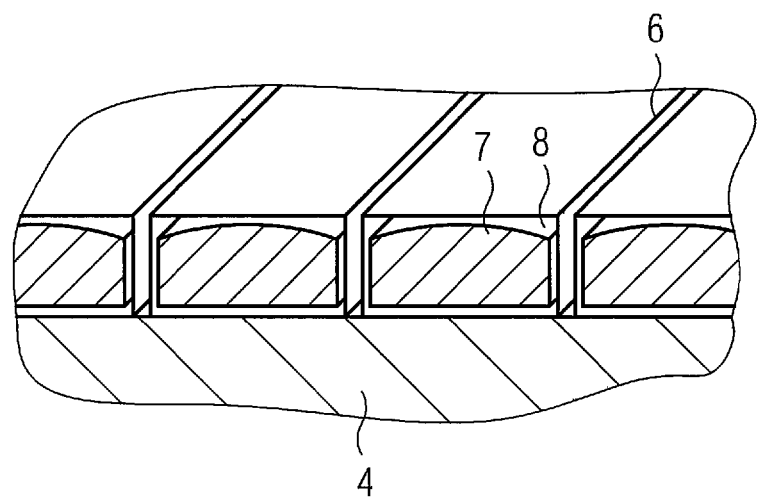
FIG. 2 is a partially sectional view of the rotor arrangement.

FIG. 2 shows in detail the tubes 6 mounted to the outer rim 4. As can be seen, the dimensions of the pole pieces 7 are smaller than the dimensions of the channel defined by the inner walls of the tubes 6. In other words, the cross-sectional profiles of the channel and the pole pieces 7 differ in such a way, that the cross section of the channel is larger than the cross section of the pole piece 7. To fill the remaining spaces, a filler substance 8 is located between the inner wall of the tubes 6 and the outer surface of the pole piece 7, stabilizing the latter in the channel.

Figure 3:
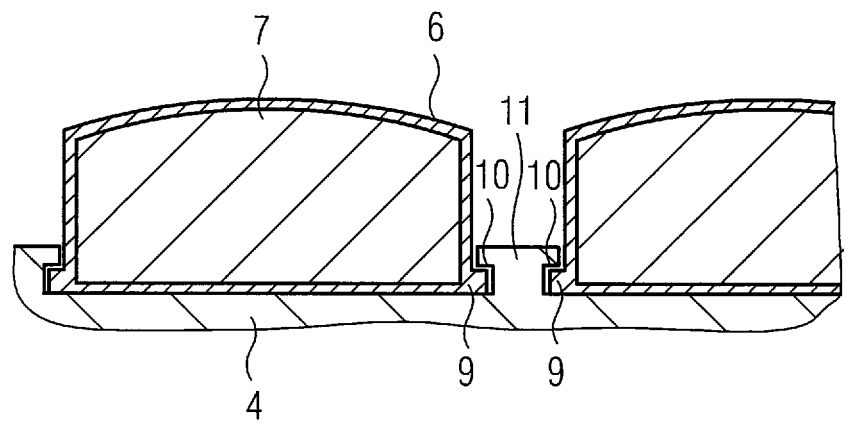
FIG. 3 is a cross-sectional view of a second embodiment of a permanent magnet rotor arrangement according to the invention.

FIG. 3 shows a second embodiment of a permanent magnet rotor arrangement 1' in a detailed view. In this case, the cross-sectional profile defined by the inner wall of the tube 6 is substantially the same as the cross-sectional profile of the pole piece 7.

The tubes 6 have protrusions 9 at their lower end. These protrusions 9 correspond to grooves 10 formed by substantially T-shaped protrusions 11 of the outer surface of the rim 4, such that a dovetail joint for affixing the tubes 6 to the rotor 2 is provided.

Figure 4:
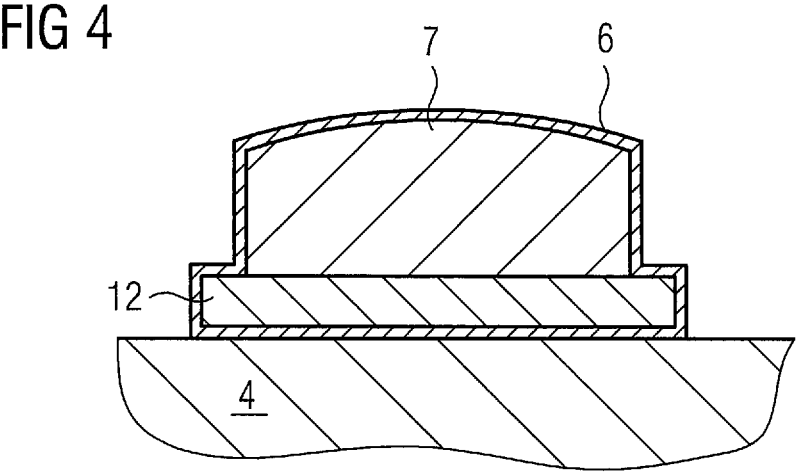
FIG. 4 is a cross-sectional view of a third embodiment of a permanent magnet rotor arrangement according to the invention.
Figure 5:
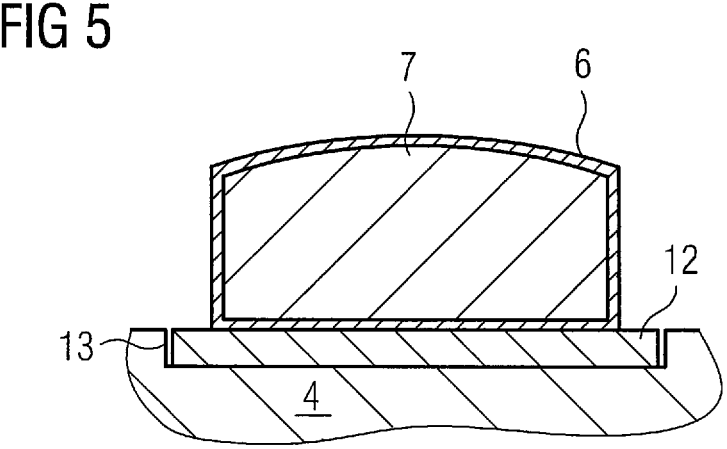
FIG. 5 is a cross-sectional view of a fourth embodiment of a permanent magnet rotor arrangement according to the invention.

FIG. 4 and FIG. 5 show two possibilities of the usage of magnet carriers 12 in two further, alternative embodiments. In FIG. 4, the pole piece 7 and the magnet carrier 12 are both enclosed by (positioned in) the profiled tube 6. The whole tubed arrangement is then affixed to the surface of the outer rim 4 of the rotor 2.

In FIG. 5, however, only the pole piece 7 is enclosed by the tube 6 and the pole piece/tube-unit is attached to the magnet carrier 12, which again is affixed to the outer surface of the rim 4 of the rotor 2. The magnet carriers 12 can be seated in respective cavities 13.

While producing such a permanent magnet rotor arrangement, the pole pieces 7 can be inserted into the tubes 6 while being magnetized or preferably demagnetized. If the profiles are not substantially the same, the inventive method provides for a deformation of the tube profile to match the pole piece profile.

Figure 6:
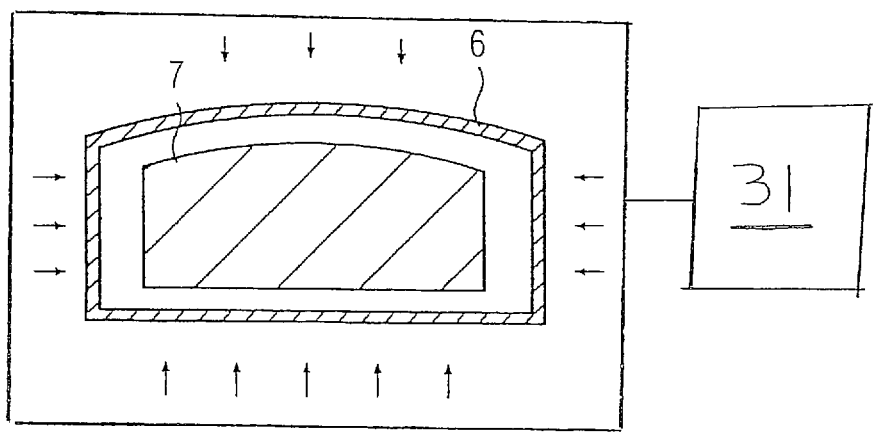
FIG. 6 is a cross-sectional view illustrating a step in a first embodiment of a method according to the invention.
Figure 7:
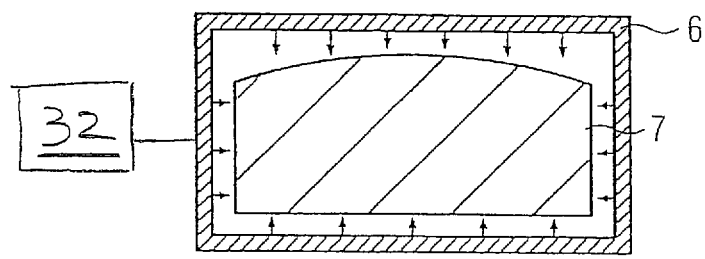
FIG. 7 is a cross-sectional view illustrating a step in a second embodiment of a method according to the invention.

Two examples of how this can be achieved are shown in FIG. 6 and FIG. 7. According to FIG. 6, an external pressing device 31 can be used after insertion of the pole piece 7 in the tube 6. The external pressing device 31 compresses the tube 6 such that it achieves the desired shape of the pole piece 7.

According to FIG. 7, a vacuum is applied via a vacuum device 32 to the channel formed by the tube 6, i.e. the spaces between the inner wall of the tube 6 and the surface of the pole piece 7 is evacuated after the pole piece 7 is positioned. The profiled tube 6 then shrinks to take the shape of the pole piece 7. This is schematically illustrated by the arrows in FIG. 7.

Generally speaking, the tubes 6 can be, for example, made of polyvinyl chloride (PVC) or stainless steel, and can be monolithic, i.e. made in one piece.

The invention claimed is:

1. A permanent magnet rotor arrangement, comprising:
   a rotor;
   a plurality of nonmagnetic, axially extending profiled tubes defining a closed channel and affixed circumferentially along the outer rim of the rotor;
   a plurality of permanent magnet pole pieces arranged in the channels,
   wherein only one pole piece is arranged in each channel, wherein said only one piece is completely encapsulated by a respective nonmagnetic profiled tube, and
   wherein the cross-sectional profile of the pole piece along a radial plane initially does not correspond to the cross-sectional profile of the channel along the radial plane,
   wherein spaces are initially produced in each channel, between a surface of each pole piece and an inner surface of each tube,
   wherein each of the plurality of nonmagnetic profiled tubes is compressed by an external compressing means or a vacuum is applied to each of the plurality of nonmagnetic profiled tubes to match the cross-sectional profile of the channel to the cross-sectional profile of the pole piece, such that their cross-sectional profiles are finally substantially equal.

2. The permanent magnet rotor arrangement according to claim 1, wherein the tubes are monolithic.

3. The permanent magnet rotor arrangement according to claim 1, wherein a filler substance is arranged in spaces between the pole piece and the inner surface of the tube.

4. The permanent magnet rotor arrangement according to claim 3, wherein the filler substance is a resin.

5. The permanent magnet rotor arrangement according to claim 1, wherein the tubes are affixed to the rotor by a dovetail joint.

6. The permanent magnet rotor arrangement according to claim 5, wherein at least one protrusion of the tubes engages at least one corresponding groove of the rotor.

7. The permanent magnet rotor arrangement according to claim 1, wherein the tubes are affixed to the rotor by one of: welding, spot welding, bolting and adhering.

8. The permanent magnet rotor arrangement according to claim 1, wherein the tubes are affixed onto at least one magnet carrier being affixed to the rotor.

9. The permanent magnet rotor arrangement according to claim 1, wherein the pole pieces are affixed on and/or supported by a magnet carrier, wherein the magnet carrier and the pole piece are enclosed in the channel.

10. The permanent magnet rotor arrangement according to claim 1, wherein the tubes are made of PVC or stainless steel.

\* \* \* \* \*